US009374300B2

(12) United States Patent
Zaidi et al.

(10) Patent No.: US 9,374,300 B2
(45) Date of Patent: Jun. 21, 2016

(54) METHODS, SYSTEMS, AND COMPUTER READABLE MEDIA FOR REGULATION OF MULTI-PRIORITY TRAFFIC IN A TELECOMMUNICATIONS NETWORK

(71) Applicant: Oracle International Corporation, Redwood Shores, CA (US)

(72) Inventors: Syed Mohsin Reza Zaidi, Morrisville, NC (US); Brian John Hassink, Cary, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 271 days.

(21) Appl. No.: 14/025,469

(22) Filed: Sep. 12, 2013

(65) Prior Publication Data

US 2015/0071074 A1    Mar. 12, 2015

(51) Int. Cl.

| G01R 31/08 | (2006.01) |
|---|---|
| H04L 12/725 | (2013.01) |
| H04L 12/819 | (2013.01) |
| H04L 12/803 | (2013.01) |
| H04L 12/851 | (2013.01) |
| H04L 12/823 | (2013.01) |
| H04L 12/26 | (2006.01) |

(52) U.S. Cl.
CPC .......... H04L 45/308 (2013.01); H04L 43/0894 (2013.01); H04L 43/16 (2013.01); H04L 47/122 (2013.01); H04L 47/215 (2013.01); H04L 47/24 (2013.01); H04L 47/32 (2013.01)

(58) Field of Classification Search
CPC ... H04L 45/308; H04L 47/215; H04L 47/122; H04L 47/24; H04L 43/0894; H04L 43/16
See application file for complete search history.

(56) References Cited

U.S. PATENT DOCUMENTS

| 5,062,055 A * | 10/1991 | Chinnaswamy et al. ...... 702/182 |
| 6,108,307 A * | 8/2000 | McConnell et al. .......... 370/235 |
| 7,277,388 B1 * | 10/2007 | Koodli ....................... 370/230.1 |
| 8,174,980 B2 | 5/2012 | Ford et al. |
| 2012/0254943 A1 * | 10/2012 | Li ................................... 726/3 |
| 2013/0070600 A1 * | 3/2013 | Nakajima et al. ............. 370/235 |
| 2014/0233402 A1 * | 8/2014 | Kenney ........................ 370/252 |
| 2014/0250201 A1 * | 9/2014 | Tapia ............................ 709/207 |
| 2015/0071074 A1 * | 3/2015 | Zaidi et al. ................ 370/235.1 |

* cited by examiner

*Primary Examiner* — Robert Wilson
(74) *Attorney, Agent, or Firm* — Jenkins, Wilson, Taylor & Hunt, P.A.

(57) ABSTRACT

Methods, systems, and computer readable media for network traffic regulation of multi-priority traffic in a telecommunications network are disclosed. According to one aspect, a method for regulation of multi-priority traffic in a telecommunications network includes, at a node for processing messages in a telecommunications network, receiving a message having an intended destination, determining a priority of the message, and obtaining, from a plurality of threshold values, each threshold value being associated with one of a plurality of message priorities, a threshold value that is associated with the determined priority. The number of messages that have been allowed during a current measurement period is determined, an action to perform on the message is selected based a relationship between the threshold value and the message count, and the selected action is performed. The method includes detecting a refresh condition, and, in response to detecting the refresh condition, starting a new measurement period.

20 Claims, 12 Drawing Sheets

```
//
// Define Token Thresholds 0~3
//
Max = 1000 // Maximum capacity of token bucket
TT0 = 500  // If bucket contains less than this #, deny p0 msgs
TT1 = 300  // If bucket contains less than this #, deny p0/p1 msgs
TT2 = 100  // If bucket contains less than this #, deny p0/p1/p2 msgs //
// Token Request Algorithm:
//
bool request(priority)
{
    refresh();
    if ((priority == 0) && (bucket > TT0))
    || ((priority == 1) && (bucket > TT1))
    || ((priority == 2) && (bucket > TT2))
    || ((priority == 3) && (bucket > 0))
    {
        --bucket;
        return true;
    }
    else
        return false;
}

//
// Token Refresh Algorithm:
//
void refresh()
{
    now = time();
    delta = now - timestamp;
    if (delta >= 1 second)
    {
        bucket = Max;
        timestamp = now;
    }
}
```

FIG. 4

```
//
// Define Token Thresholds 0~3
//
TT0 = 200  // # of tokens available to msgs of priority 0
TT1 = 200  // # of tokens available to msgs of priority 1
TT2 = 300  // # of tokens available to msgs of priority 2
TT3 = 400  // # of tokens available to msgs of priority 3

//
// Token Request Algorithm:
//
bool request(priority)
{
    refresh();
    if (bucket[priority] > 0)
    {
        --bucket[priority];
        return true;
    }
    else
        return false;
}

//
// Token Refresh Algorithm:
//
void refresh()
{
    now = time();
    delta = now - timestamp;
    if (delta >= 1 second)
    {
        bucket[0] = TT0;
        bucket[1] = TT1;
        bucket[2] = TT2;
        bucket[3] = TT3;
        timestamp = now;
    }
}
```

FIG. 6

```
//
// Define Token Thresholds 0~3
//
TT0 = 200  // # of tokens available to msgs of priority 0
TT1 = 200  // # of tokens available to msgs of priority 1
TT2 = 300  // # of tokens available to msgs of priority 2
TT3 = 400  // # of tokens available to msgs of priority 3

//
// Token Request Algorithm:
//
bool request(priority)
{
    refresh();
    for (i=priority; i>=0; i--)
    {
        if (bucket[i] > 0)
        {
            --bucket[i];
            return true;
        }
    }
    return false;
}

//
// Token Refresh Algorithm:
//
void refresh()
{
    now = time();
    delta = now - timestamp;
    if (delta >= 1 second)
    {
        bucket[0] = TT0;
        bucket[1] = TT1;
        bucket[2] = TT2;
        bucket[3] = TT3;
        timestamp = now;
    }
}
```

FIG. 8

```
//
// Define Token Thresholds 0~3
//
TT0 = 100  // # of tokens available to msgs of priority 0
TT1 = 150  // # of tokens available to msgs of priority 1
TT2 = 200  // # of tokens available to msgs of priority 2
TT3 = 250  // # of tokens available to msgs of priority 3
ANY = 300  // # of tokens available to msgs of any priority //
// Token Request Algorithm:
//
bool request(priority)
{
    refresh();
    if (bucket[i] > 0)
    {
        --bucket[i];
        return true;
    }
    else if (bucket[4] > 0)
    {
        --bucket[4];
        return true;
    }
    else
        return false;
}

//
// Token Refresh Algorithm:
//
void refresh()
{
    now = time();
    delta = now - timestamp;
    if (delta >= 1 second)
    {
        bucket[0] = TT0;
        bucket[1] = TT1;
        bucket[2] = TT2;
        bucket[3] = TT3;
        bucket[4] = ANY;
        timestamp = now;
    }
}
```

METHODS, SYSTEMS, AND COMPUTER READABLE MEDIA FOR REGULATION OF MULTI-PRIORITY TRAFFIC IN A TELECOMMUNICATIONS NETWORK

TECHNICAL FIELD

The subject matter described herein relates to methods and systems for managing telecommunications network traffic. More particularly, the subject matter described herein relates to methods, systems, and computer readable media for regulation of multi-priority traffic in a telecommunications network.

BACKGROUND

Telecommunications network traffic typically includes many types or classes of traffic, each having its own quality of service (QoS) requirements. Voice data, such as voice of Internet Protocol (VoIP) traffic, for example, values low latency over data integrity, and thus can tolerate dropped packets. Bulk data transfer, on the other hand, values data integrity over latency, and thus can tolerate delays through the network so long as data integrity is ensured. Network operators must continually balance these disparate needs, e.g., by giving VoIP calls a larger proportion of the available bandwidth when needed, and by reclaiming some of that bandwidth for use by bulk data transfer when it is no longer needed for VoIP.

The problem is not just between different types of traffic, such as voice and data; network operators typically provide different levels of QoS to different classes of traffic as well. For example, high-paying subscribers, often referred to as a top tier subscribers, will typically be given priority over lower-tier subscribers who pay less for their subscriptions. For data traffic, a top tier subscriber may have an unlimited data download rate, for example, while lower-tier subscribers have a maximum download rate and/or a maximum data transfer limit per subscription period. For voice traffic, a top-tier subscriber may assigned a higher bit rate voice encoder/decoder (codec) for voice calls, which results in better sound quality, while a lower-tier subscriber may be assigned a lower bit rate (and thus lower bandwidth) codec, which results in poorer sound quality. Thus, network operators must also allocate bandwidth and other network resources among subscribers according to the QoS level of each class of subscriber.

A conventional approach to solving the problem of how to balance the QoS requirements of the many different types and classes of traffic on the telecommunication network includes using rate-based algorithms to regulate network traffic. For example, one class of traffic may be limited to one maximum rate while another class of traffic may be limited to another maximum rate. While this approach has the advantage of being simple, it has the disadvantage that it often results in underutilization of the network, because the static limits imposed on types and classes of traffic do not allow those types and classes of traffic to make use of unused bandwidth even if that excess bandwidth is available at the time, e.g., not being used by the class of traffic for which that bandwidth has been reserved. To counter this effect, network operators are often forced to increase the maximum available bandwidth, i.e., by installing additional lines, links, optical fibers, equipment, and the like, which may have a significant expense.

Thus, there is a need for a more adept approach to balancing the needs of various types and classes of traffic in a telecommunications network. More specifically, there exists a need for regulation of multi-priority traffic in a telecommunications network.

SUMMARY

According to one aspect, the subject matter described herein includes a method for regulation of multi-priority traffic in a telecommunications network. The method includes, at a node for processing messages in a telecommunications network, the node comprising hardware, receiving a message having an intended destination. In response to receiving the message, the method includes determining a priority of the message; obtaining, from a plurality of threshold values, each threshold value being associated with one of a plurality of message priorities, a threshold value that is associated with the determined priority; determining a message count of messages that have been allowed during a current measurement period; selecting an action to perform on the message based a relationship between the threshold value and the message count; incrementing the message count; and performing the selected action. The method also includes detecting a refresh condition, and, in response to detecting the refresh condition, starting a new measurement period.

According to another aspect, the subject matter described herein includes a system for regulation of multi-priority traffic in a telecommunications network. The system includes a node comprising hardware for processing messages in a telecommunications network. The node includes a first module for maintaining multiple threshold values, each threshold value being associated with one of a plurality of message priorities, and a second module for receiving a message having an intended destination. In response to receiving the message, the second module determines a priority of the received message, obtains from the first module a threshold value that is associated with the determined priority, determines a message count of messages that have been allowed during a current measurement period, selects an action to perform on the message based a relationship between the threshold value and the message count, increments the message count, and performs the selected action. The first module is further configured to detect a refresh condition. In response to detecting the refresh condition, the first module starts a new measurement period.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 4 is a portion of pseudo-code that implements the algorithm illustrated in FIG. 3;

FIG. 6 is a portion of pseudo-code that implements the algorithm illustrated in FIG. 5;

FIG. 8 is a portion of pseudo-code that implements the algorithm illustrated in FIG. 7;

FIG. 9 is a portion of pseudo-code that implements an exemplary method for regulation of multi-priority traffic in a telecommunications network according to yet another embodiment of the subject matter described herein;

DETAILED DESCRIPTION

In accordance with the subject matter disclosed herein, methods, systems, and computer readable media for network traffic regulation using a shared, periodic-refresh, threshold-based token bucket with recovery are provided.

Reference will now be made in detail to exemplary embodiments of the present invention, examples of which are illustrated in the accompanying drawings. Wherever possible, the same reference numbers will be used throughout the drawings to refer to the same or like parts.

Figure 1:
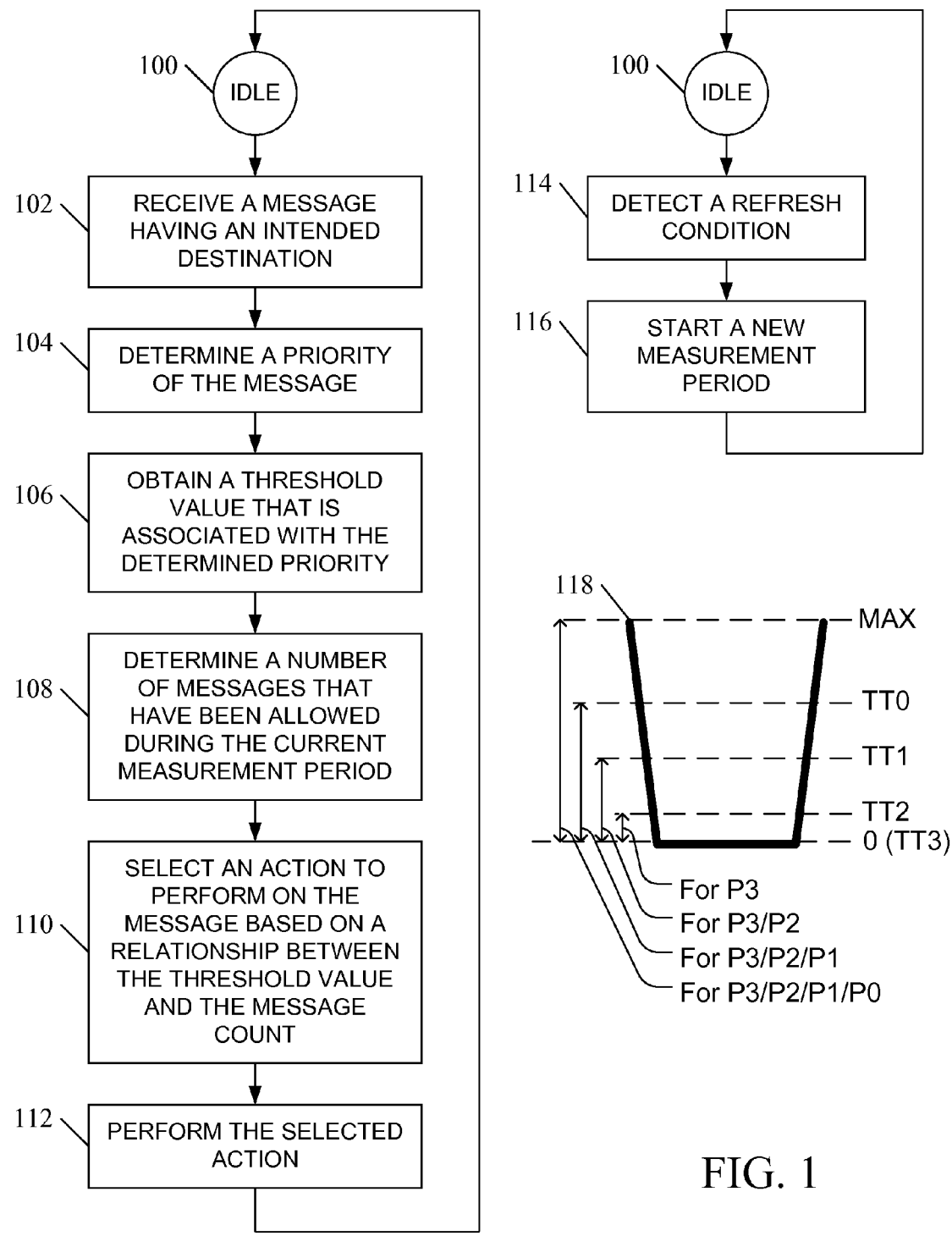
FIG. 1 is a flow chart illustrating an exemplary method for regulation of multi-priority traffic in a telecommunications network according to an embodiment of the subject matter described herein.

FIG. 1 is a flow chart illustrating an exemplary method for regulation of multi-priority traffic in a telecommunications network according to an embodiment of the subject matter described herein. In the embodiment illustrated in FIG. 1, from an idle state 100, a message having an intended destination is received (step 102). In response to receiving the message, the priority of the message is determined (step 104), and a threshold value that is associated with the determined priority is obtained (step 106). In one embodiment, the threshold value is obtained from a set of threshold values, each threshold value being associated with one message priority from a set of message priorities. The method includes determining how many messages have been allowed so far during the current measurement period (step 108), selecting an action to perform on the message based on a relationship between the threshold value and the message count (step 110), and then performing the selected action (step 112). The process then returns to the idle state 100.

The embodiment illustrated in FIG. 1 also includes the additional process steps of detecting a refresh condition (step 114), and in response to detecting the refresh condition, starting a new measurement period (step 116), before returning to the idle state 100. The process steps 114 and 116 may be performed simultaneously with or may be a parallel process to the other process steps 102, 104, 106, 108, 110, and 112.

In one embodiment, a "token bucket" may be used to regulate the number of messages that are allowed during a period of time herein referred to as "the measurement period", "the refresh period", or simply "the period". At the beginning of each measurement period, the token bucket is filled with a maximum number of tokens, i.e., the maximum number of messages that will be processed during that period. A token is removed from the bucket for each message processed during that period. When the number of tokens left in the bucket crosses a threshold, such as when the bucket becomes empty or when there are only a threshold number of tokens left in the bucket, some action can be taken or some treatment may be applied. In one embodiment, if the token bucket becomes empty, no other messages may be processed until the end of the period, at which time the bucket will be refilled to its maximum level. In this manner, a maximum effective rate of message processing can be enforced using a relatively simple and responsive programming construct.

As used herein, the term "effective rate" refers to the average rate of messages processed during a measurement period. For embodiments that use a token bucket, the effective rate may be calculated as the number of tokens consumed during a measurement period divided by the duration of the measurement period.

As used herein, the term "effective rate limit" refers to the maximum effective rate imposed by the methods and systems described herein. For embodiments that use a token bucket, the effective rate limit may be calculated as the number of tokens provided during a refresh, which occurs at the beginning of a measurement period, divided by the duration of the measurement period.

As used herein, the term "actual rate" refers to the rate of messages processed during an interval less than the measurement period. For embodiments that use a token bucket, the actual rate may be calculated as the number of tokens consumed divided by the time taken to consume them. In one embodiment, actual rate may be calculated when a token bucket becomes exhausted by dividing the number of tokens provided to that token bucket at the last refresh by the duration of time since that last refresh.

In the embodiment illustrated in FIG. 1, for example, a token bucket 118 may be used. Token bucket 118 may be refreshed periodically, e.g., at regular intervals, aperiodically, such as upon the detection of a trigger condition, or using some other suitable scheme. In an embodiment described in more detail below, for example, token bucket 118 may be refreshed upon detection of a trigger condition, but with a minimum refresh period imposed. In one embodiment, for example, DA 108 may use per-second controls. An effective rate limit of 1000 messages/second can be enforced using a token-bucket of depth 1000, and a refresh rate of 1 second. Whether the bucket gets exhausted in 1 millisecond or 999 milliseconds, if the bucket is exhausted before being refreshed, the system can determine that the actual rate is at least equal to the effective rate limit, and can take action accordingly without having to know the exact actual rate, which greatly simplifies implementation.

Because the action is taken or treatment is applied as soon as the trigger condition is met, the systems and methods of the subject matter disclosed herein are very responsive. In contrast, conventional rate-based approaches must wait until the end of the measurement period used to calculate actual rate before they can respond. Unlike conventional rate-based approaches, the systems and methods of the subject matter described herein can respond to a trigger condition, such as token exhaustion or detection that a token threshold (or other type of threshold) has been crossed, immediately.

Another advantage of the subject matter described herein is that, by adjusting the duration of the refresh period, the responsiveness of the system to traffic bursts can be tuned, e.g., the periodicity of refresh can be used to limit traffic to a specific actual rate. For example, a system may desire to limit all packet traffic to an effective rate of 1000 packets per second. Using the token bucket approach, token bucket 118 may be refilled with 1000 tokens every second. If all 1000 tokens are consumed within the first 100 milliseconds, no other packets will be allowed for the remaining 900 milliseconds of the refresh period, thus enforcing the 1000 packet per second effective rate limit.

In this example, however, for the first 100 milliseconds the actual traffic rate was much higher than the effective rate. The actual traffic rate may be calculated at the time that the threshold condition occurs by dividing the number of tokens consumed by the time elapsed since the last refresh period (e.g., 1000 packets/100 ms=10,000 packets per second.) Thus, an additional benefit of the token bucket approach described herein is that, by using the token threshold as a trigger to calculate actual rate, a dedicated timer or timer resource is not required, further simplifying the hardware implementation. It should be noted, however, that calculation of actual rate is not required by the methods and systems described herein.

By changing the refresh period from 1 second to 100 ms and by changing the number of tokens provided upon refresh from 1000 to 100, the same effective rate limit will be enforced (100 packets/100 ms=1000 packets per second) but the actual rate will be reduced: only 100 packets would be allowed during the first 100 ms of packet traffic, instead of 1000 packets that were allowed during the first 100 ms of packet traffic in the example above. In this manner, packet traffic is more evenly distributed across the same 1 second period than in the example above. This means that packet discards or other treatments would also be more evenly distributed across that same 1 second period. Since calculation of actual rate can be trivially done whenever a threshold condition occurs, in one embodiment, actual rate may be used to tune the operation of the system. For example, if, at a threshold crossing or token exhaustion event, a high actual rate is detected, this may trigger the system to adjust the refresh period and token counts as described above, which would operate to limit burst rates.

Several threshold values may be defined for token bucket 118. In the embodiment illustrated in FIG. 1, for example, there are five threshold levels associated with token bucket 118: a maximum value, called MAX; a threshold value associated with messages of priority 0, called token threshold 0, or TT0; a threshold value associated with messages of priority 1 (TT1); a threshold value associated with messages of priority 2 (TT2); and an implied threshold value associated with messages of priority 3 (TT3)—namely, the value zero (0). As will be seen in other embodiments below, however, there are multiple ways to define and use threshold values TT0 TT3.

For the purposes of illustration, the example embodiments described herein assume that there are four message priorities: messages of priority 0 (P0), messages of priority 1 (P1), messages of priority 2 (P2), and messages of priority 3 (P3), where P0 messages are lowest priority and P3 messages are highest priority. The subject matter described herein is not so limited, however, and contemplates other numbers of priorities, as well as other types of message classification. For example, messages may be categorized by type, class, size, or any other type of message attribute. Priority is used as a convenient and readily understandable classification for the purposes of illustration, but the subject matter described herein is not so limited.

In one embodiment, token bucket 118 may be shared across classifications. This avoids under-utilization of network capacity by not dedicating capacity exclusively for each classification, and thus avoids under-utilization caused when one class of traffic is not currently using capacity reserved for its exclusive use. Instead, each class has the ability to use available capacity that is not currently being used by a higher class. In the embodiment illustrated in FIG. 1, for example, when token bucket 118 is full, tokens may be taken by messages of any priority, on a first-come, first-served basis. This continues until the number of tokens in token bucket 118 (hereinafter referred to as the "fill level") drops below TT0, after which P0 messages are discarded. The remaining tokens are shared among messages or priority 3, 2, and 1, until the fill level drops below TT1, after which both P1 messages are also discarded in addition to P0 messages. The remaining tokens are shared among messages of priority 3 and 2 until the fill level drops below TT2, after which P2 messages are also discarded. The remaining tokens are available only to P3 messages until the fill level drops below TT3, at which time the bucket is empty and thus all messages are discarded until the bucket is refreshed. In this manner, token bucket 118 can be used control treatment of traffic at discrete levels of capacity depletion. Rather than a static allocation of capacity to each class or type of traffic as in conventional systems, the ability of lower-priority traffic to get additional bandwidth is curtailed as utilization increases. That is, as available bandwidth or other network resources become scarce, they become available only to higher tier subscribers and/or only for higher-priority traffic.

Actions that can be performed based on the relationship between the threshold value and the message count include, but are not limited to discarding the received message, processing the message, buffering the message temporarily, forwarding the message to the intended destination, and redirecting the message to a destination other than the intended destination. Other actions include modifying the operation of a module within the node, a service hosted by the node, or a feature of the node. For example, a node that is receiving a high volume of traffic could temporarily turn off some components and reuse those resources elsewhere or set up additional resources to handle traffic load. A node may cease supporting a feature or service and advertise that fact to other nodes in the network, and thereby reduce traffic to the node. Other actions may be taken that ultimately serve to protect the node or to protect the network. The actions taken by the application of the systems and methods described herein for the purpose of Ingress control, for example, can be thought of as actions taken to protect a system.

Not only can token bucket 118 be used to enforce an effective rate limit, it can also be used to compute an actual rate based on the threshold crossing. For example, the amount of time required to consume a certain amount of tokens can be used to calculate actual rate. Since this calculation can be triggered upon the detection of a crossed threshold, rather than waiting until the end of a measurement period as is conventionally done, the token bucket approach is more responsive, e.g., has a faster response time, which allows the system to react quickly to specific traffic conditions. In contrast, conventional rate-based algorithms suffer the disadvantage that accurate, actual rate calculation required to impose a rate cap, for example, involves continuous recalculations of rate. The higher the frequency of recalculation, the more accurate the actual rate calculation will be, but at the cost of higher resource usage. The token bucket approach disclosed herein provides an estimated rate calculation—the effective rate—which is sufficiently accurate but which uses significantly fewer resources to calculate when compared to the resources required to calculate an accurate actual rate. This makes the token-bucket approach very attractive for use in telecommunications equipment.

In addition, conventional rate-based algorithms are typically static, e.g., little or no adjustment of rate limits as network conditions change. Even if rate based algorithms were to adjust rate limits as network conditions changes, however, they cannot be as responsive as the token-bucket approach disclosed herein, because rate based algorithms impose rate limits on entire classes or types of traffic, while the token bucket based approach described herein makes no assumptions about entire classes or types of traffic, but instead makes decisions in response to real-time traffic conditions. Unlike rate-based algorithms, the token bucket approach described herein is not bound by limits that are speculatively imposed.

In one embodiment, token bucket 118 is capable of supporting a recovery period, to let the system recover if a threshold is crossed, i.e., there may be a "back-off" mechanism, which is described in more detail in FIG. 10, below. This mechanism allows the system to recover by continuing to apply treatment(s) specified for lower level(s) of capacity depletion for a specified period of time, and by letting capacity accrue while the system is in recovery. In addition, token bucket 118 is capable of providing a hard cap on the total amount of traffic in any given duration. For example, token bucket exhaustion indicates the complete exhaustion of capacity allotted for the refresh period and can be used to provide a strict limit on the total amount of traffic in that period and thus over a longer period of time. In one embodiment, the back-off condition is imposed for a specified duration of time associated with messages of that particular priority. In one embodiment, the back-off condition is imposed on messages of that particular priority and also messages of lower priorities.

Figure 2:
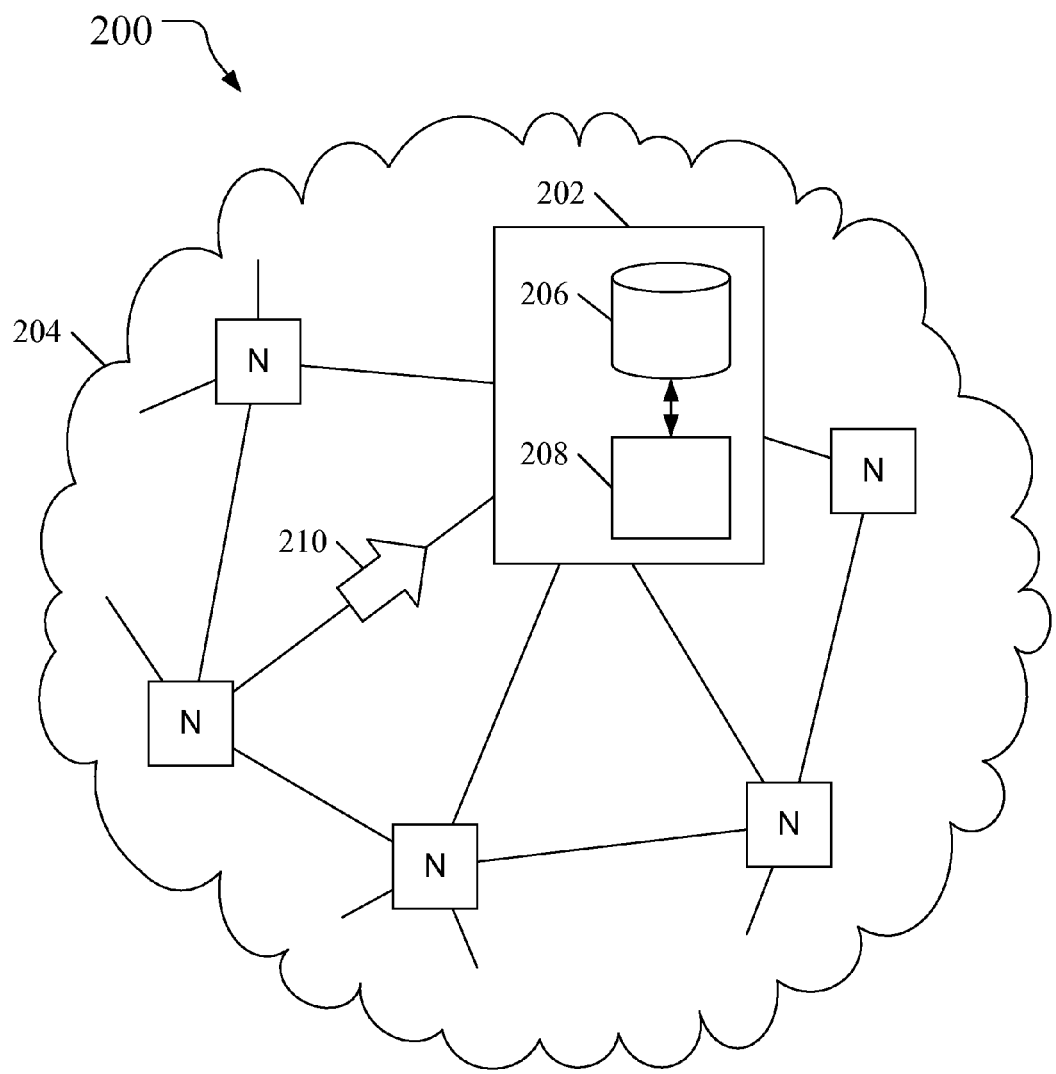
FIG. 2 is a block diagram illustrating an exemplary system for regulation of multi-priority traffic in a telecommunications network according to an embodiment of the subject matter described herein.

FIG. 2 is a block diagram illustrating an exemplary system for regulation of multi-priority traffic in a telecommunications network according to an embodiment of the subject matter described herein. In the embodiment illustrated in FIG. 2, system 200 includes a node 202 having hardware for processing messages in a telecommunications network 204 that includes other nodes N. In one embodiment, node 202 may be a node that supports the Diameter protocol. For example, node 202 may be a Diameter agent, which is a Diameter node that provides either relay, proxy, redirect, or translation services. In one embodiment, node 202 may be a Diameter signaling router (DSR) or Diameter routing agent (DRA).

In one embodiment, node 202 includes a first module 206 for maintaining a set of threshold values, each threshold value being associated with one of a set of message priorities. In one embodiment, first module 206 may maintain one or more token buckets 118 along with multiple threshold values, such as values MAX, TT0, TT1, TT2, and TT3 as illustrated in FIG. 1.

In one embodiment, node 202 includes a second module 208 for receiving a message 210 having an intended destination, and, in response to receiving the message, determining a priority of the received message, obtaining from first module 206 a threshold value that is associated with the determined priority, determining a message count of messages that have been allowed during a current measurement period, selecting an action to perform on the message based a relationship between the threshold value and the message count, and performing the selected action. Node 202 is further configured to detect a refresh condition, and, in response to detecting the refresh condition, start a new measurement period.

Figure 3:
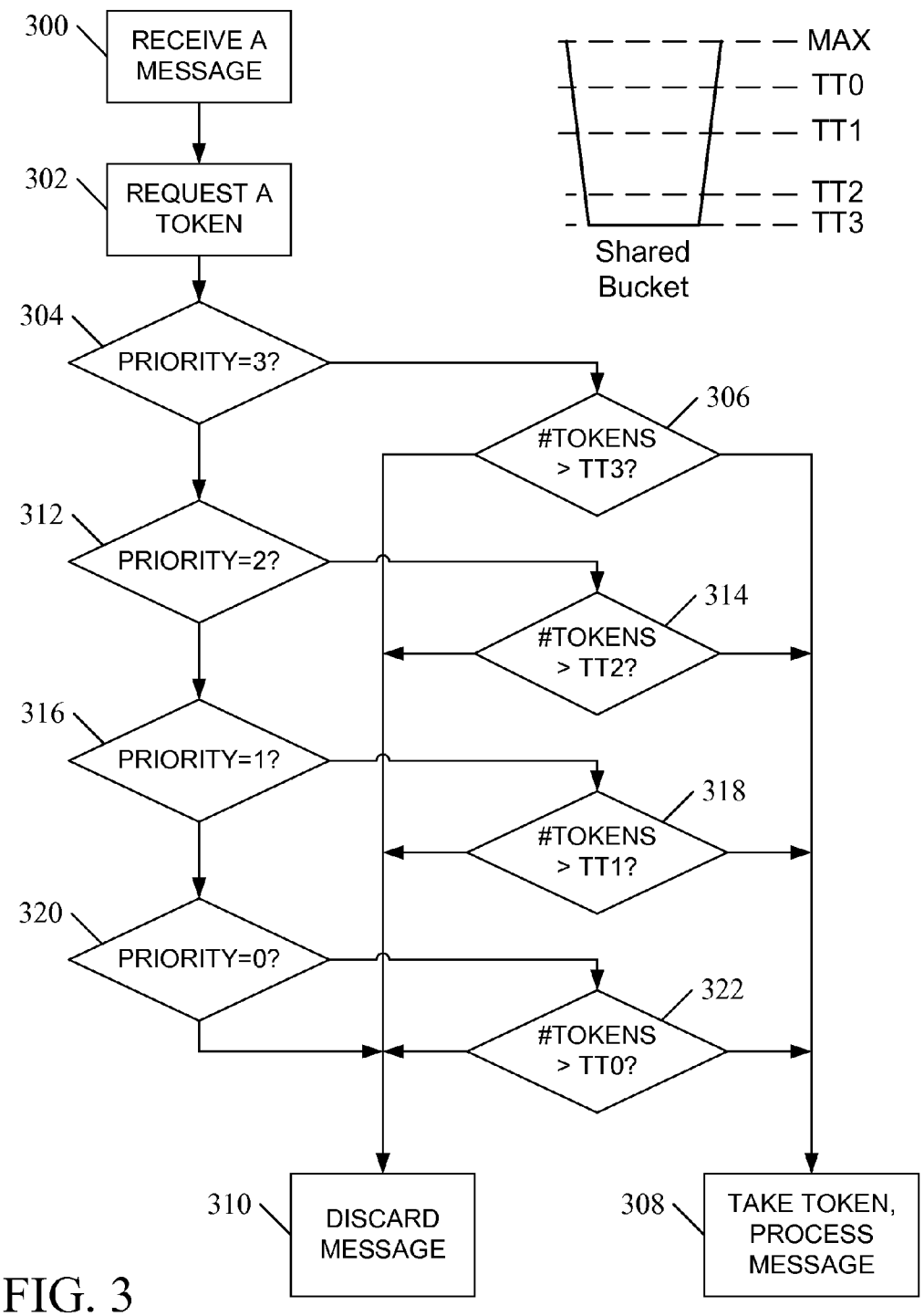
FIG. 3 is a flow chart illustrating an exemplary method for regulation of multi-priority traffic in a telecommunications network according to another embodiment of the subject matter described herein.

FIG. 3 is a flow chart illustrating an exemplary method for regulation of multi-priority traffic in a telecommunications network according to another embodiment of the subject matter described herein. In the embodiment illustrated in FIG. 3, messages may have a priority value ranging from 0 to 3, where 0 is the lowest priority and 3 is the highest priority, and a single token bucket is used for all message priorities.

At step 300, a message is received. In response to receiving a message, at step 302, a token is requested. The message priority is compared to available message priorities, in order from highest priority to lowest priority. Thus, in step 304, the process checks to see whether the message priority=3. If so, the process then checks to see if there are any tokens left in the token bucket (step 306.) If so, a token is removed from the token bucket and the message is processed, e.g., forwarded to its intended destination (step 308.) If, at step 306, there are no tokens left in the token bucket, the message is discarded (step 310.)

If it was determined at step 304 that the message is not the highest message priority, then at step 312, the process checks to see whether the message is the next highest priority, priority 2. If so, then at step 314, it is determined whether the number of tokens remaining in the token bucket are above a threshold level associated with tokens of priority 2, or "TT2". If the number of tokens remaining in the token bucket is greater than TT2, the message is processed (step 308); otherwise, the message is discarded (step 310.)

If it was determined at step 312 that the message was not priority 2, then at step 316 the process checks to see whether the message is the next lower priority, priority 1. If so, the process moves to step 314. At step 314, if the number of tokens remaining in the token bucket is greater than the threshold level associated with tokens of priority 1, "TT1", then the message is processed (step 308); otherwise, the message is discarded (step 310.)

If it was determined at step 316 that the message was not priority 1, then at step 320 the process checks to see whether the message is the next lower priority, priority 0. If so, the process moves to step 322. At step 322, if the number of tokens remaining in the token bucket is greater than the threshold level associated with tokens of priority 0, "TT0", then the message is processed (step 308); otherwise, the message is discarded (step 310.)

If it was determined at step 320 that the message was not priority 0, then the message is assumed to have an invalid priority and is discarded (step 310.)

FIG. 4 is a portion of pseudo-code that implements the algorithm illustrated in FIG. 3. In addition, FIG. 4 shows a function called "refresh", which detects a refresh condition and, in response, refills the token bucket to its maximum value. In one embodiment, the token bucket is refreshed periodically. In the embodiment illustrated in FIG. 4, the refresh subroutine is called every time a token is requested, and determines how much time has passed since the last refresh operation. In the embodiment illustrated in FIG. 4, the time at which the last refresh operation was performed is stored in the variable named "timestamp", and the current time is stored in the variable named "now". If the refresh routine determines that it has been one second or longer since the last refresh operation, a new refresh operation is performed, and the current time is stored into the variable "timestamp". Thus, in the embodiment illustrated in FIG. 4, the token bucket has a maximum refresh rate of once every second, but could be refreshed less often than that, depending on when packets arrive and tokens are requested as a result. Thus, detecting a refresh condition may include detecting that at least one second of time has elapsed since the last refresh. In an alternative embodiment, a timer could be used to trigger a refresh periodically, regardless of packet traffic.

Figure 5:
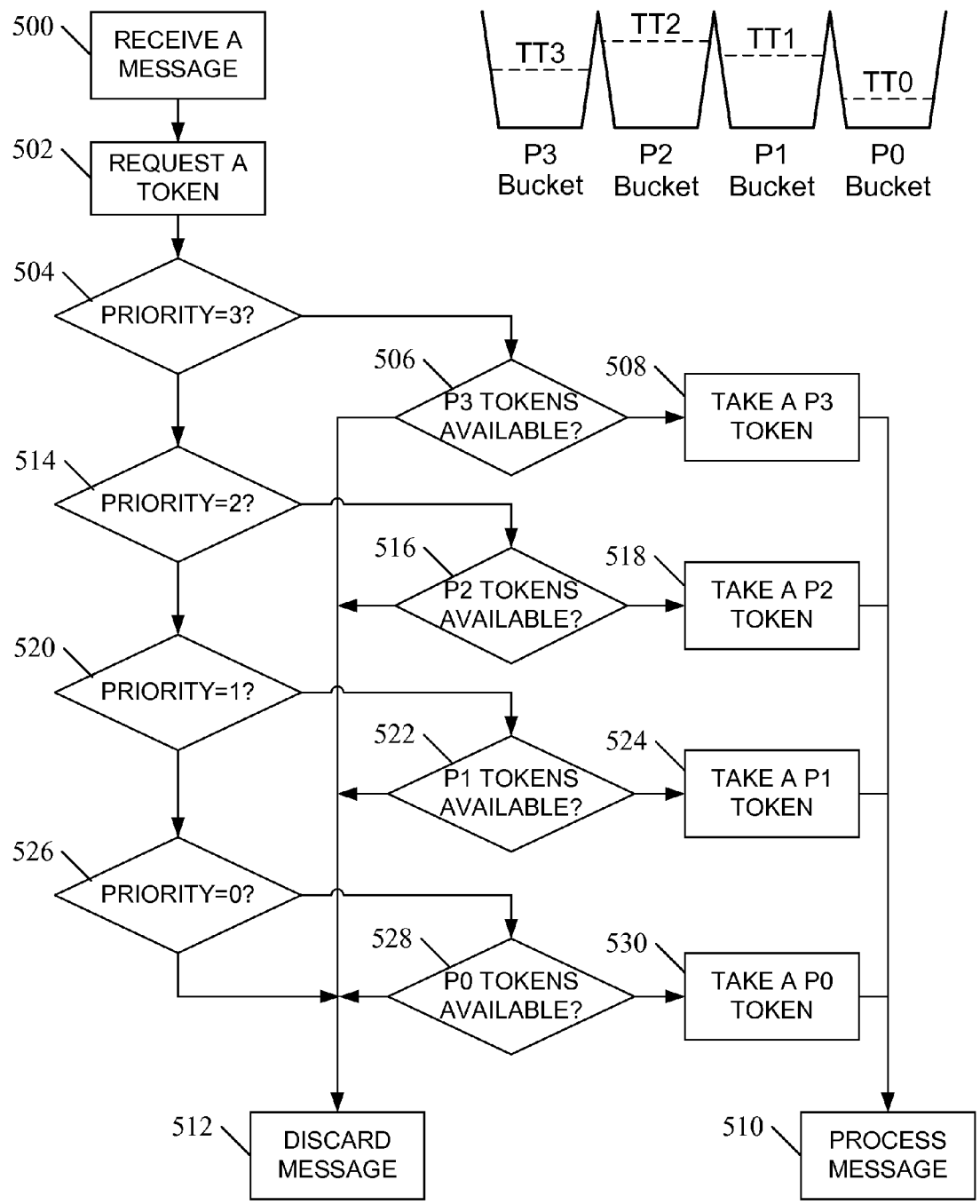
FIG. 5 is a flow chart illustrating an exemplary method for regulation of multi-priority traffic in a telecommunications network according to yet another embodiment of the subject matter described herein.

FIG. 5 is a flow chart illustrating an exemplary method for regulation of multi-priority traffic in a telecommunications network according to yet another embodiment of the subject matter described herein. In the embodiment illustrated in FIG. 5, messages may have a priority value ranging from 0 to 3, where 0 is the lowest priority and 3 is the highest priority, and separate token buckets are used for each message priority. The token bucket for messages of priority 0 is called the "P0 bucket", the token bucket for messages of priority 1 is called the "P1 bucket", and so on. For brevity, taking a token from the P3 bucket, for example, is referred to as "taking a P3 token", taking a token from the P2 bucket is referred to as "taking a P2 token", and so on.

At step 500, a message is received. In response to receiving a message, at step 502, a token is requested. The message priority is compared to available message priorities, in order from highest priority to lowest priority. Thus, in step 504, the process checks to see whether the message priority=3. If so, the process then checks to see if there are any tokens left in the P3 bucket (step 506.) If so, a token is removed from the P3 bucket (step 508) and the message is processed (step 510.) If, at step 506, there are no tokens left in the token bucket, the message is discarded (step 512.) A process similar to the steps of 504, 506, and 508 is performed for each priority, e.g., for message of priority 2 (steps 514, 516, and 518), for messages of priority 1 (steps 520, 522, and 524), or messages of priority 0 (steps 526, 528, and 530.) Messages that have an invalid priority are discarded (step 512.)

FIG. 6 is a portion of pseudo-code that implements the algorithm illustrated in FIG. 5. In addition, FIG. 6 shows a function called "refresh", which detects a refresh condition. When a refresh condition occurs, each of the separate token buckets is refilled with a specific number of tokens. Each bucket may be filled with the same number of tokens, or, as shown in FIG. 6, different buckets may get different numbers of tokens. In the embodiment illustrated in FIG. 6, for example, bucket P3 is refilled to 400 tokens at every refresh, but bucket P0 is refilled only to 200 tokens.

Figure 7:
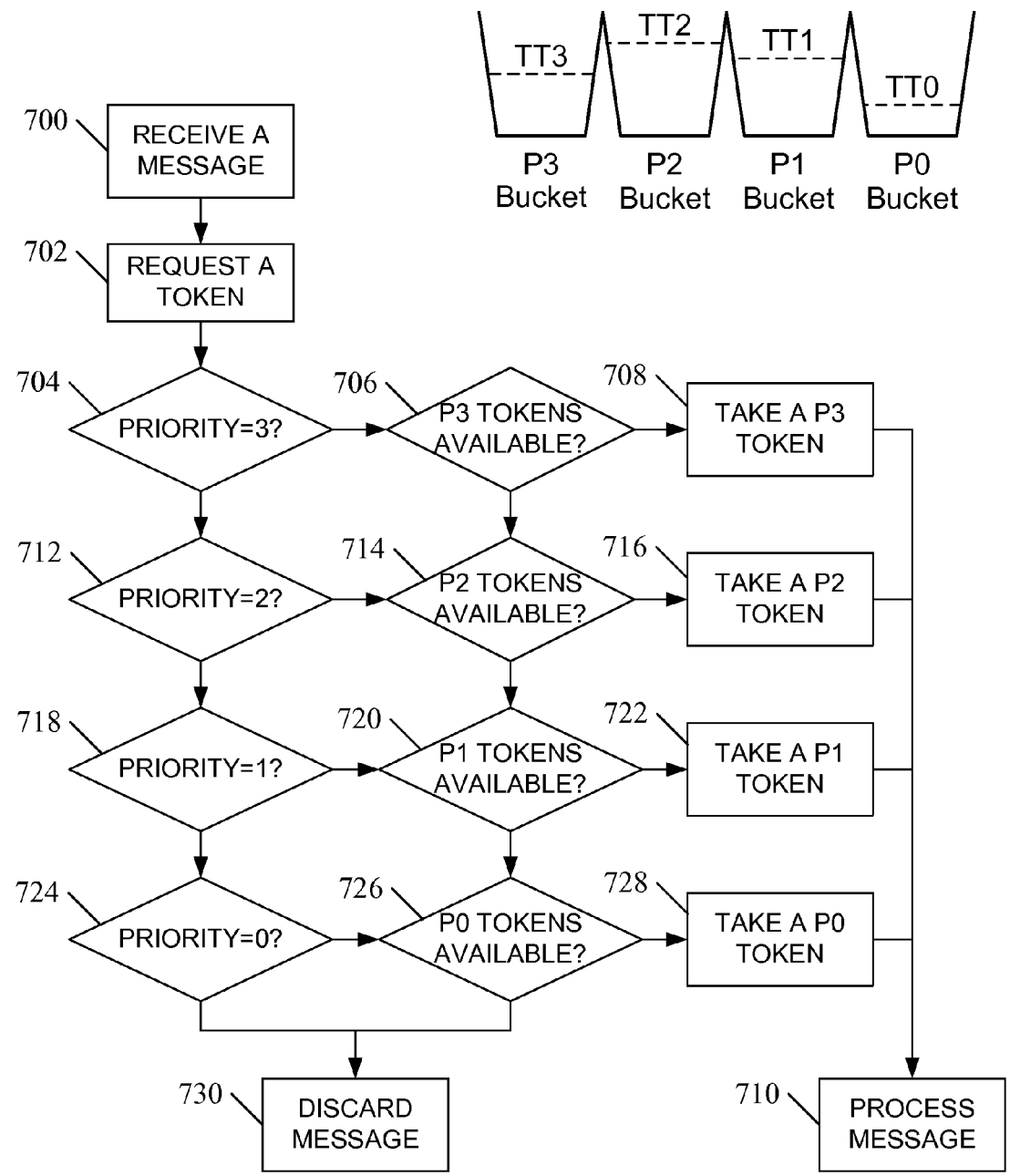
FIG. 7 is a flow chart illustrating an exemplary method for regulation of multi-priority traffic in a telecommunications network according to yet another embodiment of the subject matter described herein.

In the embodiment illustrated in FIG. 5, each of the separate token buckets is reserved for exclusive use by messages of that priority. FIG. 7 shows an embodiment in which the higher priority messages can steal from the lower priority buckets.

FIG. 7 is a flow chart illustrating an exemplary method for regulation of multi-priority traffic in a telecommunications network according to yet another embodiment of the subject matter described herein.

At step 700, a message is received. In response to receiving a message, at step 702, a token is requested. The message priority is compared to available message priorities, in order from highest priority to lowest priority. Thus, in step 704, the process checks to see whether the message priority=3. If so, the process then checks to see if there are any tokens left in the P3 bucket (step 706.) If so, a token is removed from the P3 bucket (step 708) and the message is processed (step 710.) A process similar to the steps of 704, 706, and 708 is performed for each priority, e.g., for message of priority 2 (steps 712, 714, and 716), for messages of priority 1 (steps 718, 720, and 722), or messages of priority 0 (steps 724, 726, and 728.) Messages that have an invalid priority are discarded (step 730.)

At each level, however, if the token bucket for a particular message priority is empty, the token bucket for the next lower priority is checked. For example, if there are no P3 tokens available at step 706, the process goes to step 714, which checks to see if there are any P2 tokens available. If no P2 tokens are available, the P1 token bucket is checked (step 720), and the P1 token bucket is empty then the P0 token bucket is checked (step 726.) If at any point a token is available, that token is taken and the message is processed. In this manner, priority 0 messages may take a token from the P0 bucket, priority 1 messages may take a token from the P1 bucket or the P0 bucket, priority 2 messages may take a token from the P2, P1, or P0 buckets, and priority 3 messages may take a token from the P3, P2, P1, or P0 buckets.

FIG. 8 is a portion of pseudo-code that implements the algorithm illustrated in FIG. 7. Upon the receipt of a message, the message priority is determined and a request is made for a token of the determined priority. The token buckets are searched one by one, starting from the bucket for the determined priority. If a token is found, the token is taken from that bucket and the message is processed. If not, buckets of lower and lower priority are searched until an available token is found. If no tokens are found, the message is discarded. A refresh routine determines whether more than a second of time has elapsed since the last refresh, and if so, refills each of the token buckets with the number of tokens for that bucket.

FIG. 9 is a portion of pseudo-code that implements an exemplary method for regulation of multi-priority traffic in a telecommunications network according to yet another embodiment of the subject matter described herein. The embodiment illustrated in FIG. 9 is similar to the embodiment illustrated in FIGS. 5 and 6, except that an additional, shared token bucket is provided. When a message is received, the message priority is determined and a token of that priority is requested. In the embodiment illustrated in FIG. 9, the token bucket for that priority is checked first; if it contains at least one token, a token is removed from that bucket and the message is processed. If that token bucket is empty, the process next checks to see if a shared bucket contains any tokens. If so, the message is processed; if not the message is discarded. When the current measurement period ends or another refresh condition occurs, the shared bucket is also filled with a threshold number of tokens. In the embodiment illustrated in FIG. 9, for example, the shared token bucket will contain 300 tokens immediately after a refresh.

In an alternative embodiment, the shared bucket is drained first by any priority of messages, and then the priority-specific buckets are drained. In yet another alternative embodiment, priority-specific buckets may be drained first, then a shared bucket, after which the higher-priority messages may take from lower-priority buckets. In the examples above, operations that compare thresholds or search buckets occur in order of highest priority to lowest priority, but in alternative embodiments operations may be performed in order of lowest priority to highest priority. It is noted that starting with a full token bucket and removing a token for each message allowed until the bucket is empty is functionally identical to starting with an empty token bucket and adding a token for each message allowed until the bucket is full, and that the threshold values would be flipped accordingly.

Figure 10:
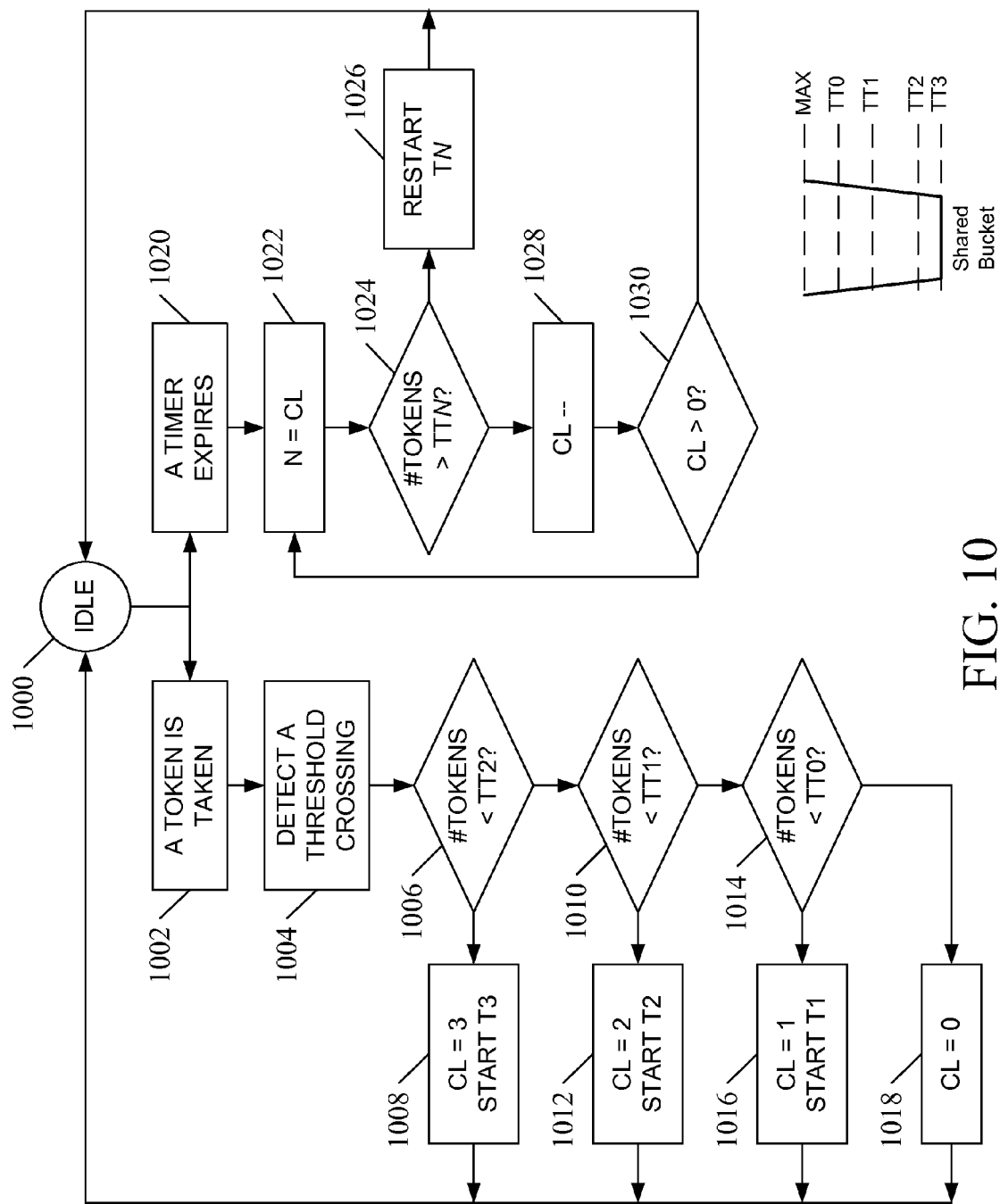
FIG. 10 is a flow chart illustrating an exemplary method for regulation of multi-priority traffic in a telecommunications network according to yet another embodiment of the subject matter described herein.

FIG. 10 is a flow chart illustrating an exemplary method for regulation of multi-priority traffic in a telecommunications network according to yet another embodiment of the subject matter described herein. FIG. 10 shows the operation of a back-off mechanism according to one embodiment of the subject matter described herein. The embodiment of the back-off algorithm illustrated in FIG. 10 operates independently of the token bucket, in that a back-off mechanism can cause packets to be discarded, redirected, or otherwise not processed even if there are tokens available. The back-off mechanism thus may be used to further rate limit a particular class of packets that would otherwise hog tokens to the detriment of other packet classes.

In the embodiment illustrated in FIG. 10, the process starts at idle state 1000. At step 1002, a token is taken from a shared bucket, such as is described in FIG. 3. At step 1002, a threshold crossing is detected. For example, the number of tokens remaining in the shared token bucket (# TOKENS) may drop below one of the thresholds TT0-TT3.

At step 1006, if # TOKENS is less that threshold TT2, then at step 1008 a congestion level indicator, CL, is set to a congestion level of 3, e.g., to indicate a highly congested state, and a back-off timer T3 is started. If # TOKENS is not less than TT2, then at step 1010 # TOKENS is compared to another threshold level, e.g., TT1.

If # TOKENS is less than TT1, then at step 1012 CL is set to a congestion level of 2, e.g., to indicate a moderately congested state, and back-off timer T2 is started. If # TOKENS is not less than TT1, then at step 1014 # TOKENS is compared to TT0.

If # TOKENS is less than TT0, then at step 1016 CL is set to a congestion level of 1, e.g., to indicate a mildly congested state, and back-off timer T1 is started. If, at step 1014, # TOKENS is not less than TT0, then CL is set to zero, e.g., to indicate a non-congested state.

In one embodiment, there may be separate timers for each congestion level; alternatively, a single timer may be used to time the back-off periods for each congestion level, or some means other than a timer may be used to impose the back-off period. The consequences of imposing a back-off period will be described in more detail below.

In one embodiment, a back-off period is a duration of time during which one or more classes of packets may be discarded, barred, etc., even if there are tokens available. In one embodiment, the value of CL indicates the congestion level, and the congestion level determines what back-off policies to apply or back-off actions to implement. For example, in one embodiment, if CL=1, then the lowest priority packets (e.g., P0 packets) are discarded until the end of the back-off period, even if there are tokens available for that priority. Likewise, if CL=2, then P0 and P1 packets are discarded until the end of the back-off period, even if tokens are available; if CL=3, then P0, P1, and P2 packets are discarded until the end of the back-off period, even if tokens are available. If CL=0, then packets are only discarded if there are no tokens available for that priority of packets.

Returning again to idle state 1000, at step 1020 a timer expires, indicating the end of a back-off period. The process checks to see if the congestion level has changed since the back-off period was started. In the embodiment illustrated in FIG. 10, for example, at step 1022, the current congestion level CL is stored as variable N, and at step 1024, # TOKENS is compared to threshold level TTN. If # TOKENS is still below TTN, then at step 1026 the timer for congestion level N is restarted, and the process returns to idle state 1000. On the other hand, if # TOKENS is now above TTN, then at step 1028, the current value for CL is decremented by one, and the process goes to step 1030. At step 1030, if CL is greater than zero, then the process returns to step 1022, where # TOKENS is compared to TT(N−1), and so on. In this manner, each time the congestion level is reduces, the back-off timer for the new congestion level is restarted, which results in a gradual reduction of congestion level. If, at step 1030, CL equals zero, this indicates that congestion has cleared, and no additional back-off steps are taken.

Figure 11:
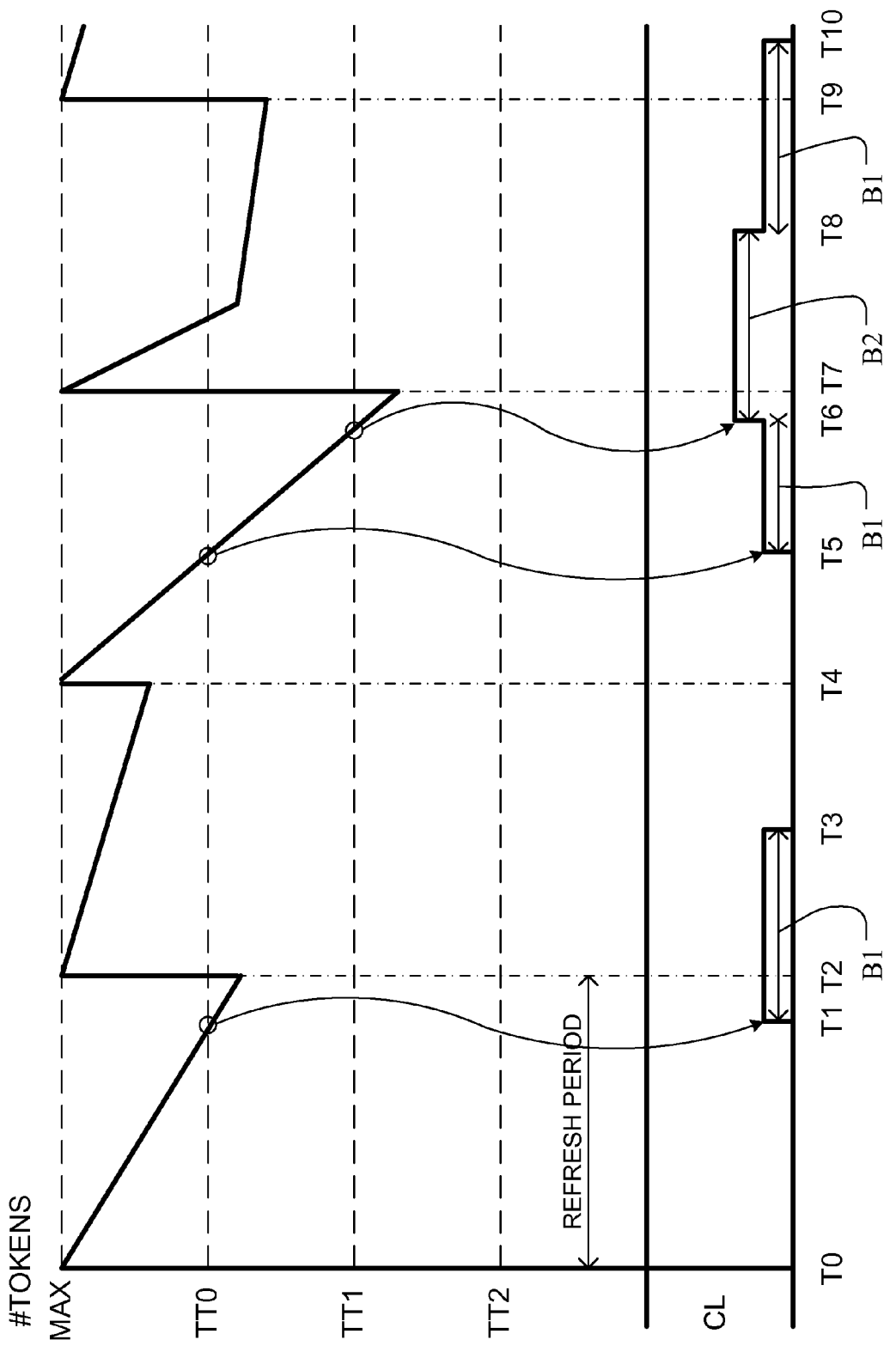
FIG. 11 is a timing diagram illustrating operation of an exemplary method for regulation of multi-priority traffic in a telecommunications network according to yet another embodiment of the subject matter described herein.

FIG. 11 is a timing diagram illustrating operation of an exemplary method for regulation of multi-priority traffic in a telecommunications network according to yet another embodiment of the subject matter described herein. FIG. 11 includes a top graph showing number of tokens (# TOKENS) in a shared bucket as a function of time, and a bottom graph showing congestion level CL as a function of time. FIG. 11 shows four a portion of time that includes four refresh periods. For ease of explanation, in the embodiment illustrated in FIG. 11, a refresh occurs at defined intervals. In alternative embodiments, however, a refresh may occur aperiodically, e.g., upon a refresh trigger condition, etc.

Starting at time T0, the token bucket is filled with its maximum number of tokens, MAX. Immediately afterward, # TOKENS begins to drop as tokens are removed from the shared token bucket. At time T1, # TOKENS crosses a threshold, i.e., # TOKENS drops below TT0. This causes CL to increase from 0 to 1, and triggers the beginning of a back-off interval for congestion level one, B1. In one embodiment, during this interval lowest priority packets (P0 packets) are discarded (e.g., for incoming packets) or suppressed (e.g., for outgoing packets.) For brevity, packets that are discarded or suppressed are hereinafter said to be "discarded".

At time T2, a first refresh occurs, and the shared token bucket is refilled to its maximum value, MAX. However, because back-off interval B1 has not expired yet, P0 packets are still discarded.

At time T3, back-off interval B1 expires. At that time, the system looks at the current value of # TOKENS. In this example, # TOKENS is above TT0, so CL is decremented to zero. Starting from time T3, P0 packets are allowed.

At time T4, a second refresh occurs, and the shared token bucket is refilled to MAX.

At time T5, # TOKENS drops below TT0. This causes CL to be incremented to one and starts back-off interval B1, during which time P0 packets are discarded.

At time T6, # TOKENS drops below TT1. In the embodiment illustrated in FIG. 11, this immediately terminates back-off interval B1 and starts a back-off interval for congestion level 2, B2, which may have the same duration as B1 or may be a different duration than B1.

At time T7, a third refresh occurs. # TOKENS is reset to MAX, but because CL=2, both P0 and P1 packets are discarded.

At time T8, back-off interval B2 expires. In the embodiment illustrated in FIG. 11, CL is decremented from 2 to 1, the system looks at the current value of # TOKENS. Here, # TOKENS is still below TT0, so a back-off interval B1 is started. During interval B1, P1 packets are allowed again while P0 packets continue to be discarded.

In one embodiment, at time T8 if # TOKENS had been above TT0, the system would have set CL=0 immediate. In an alternative embodiment, the system would simply start the back-off interval for the decremented value of CL regardless of the current value of # TOKENS, resulting in a gradual ramp-down of CL (provided that # TOKENS remains above the threshold corresponding to the value of CL at that time.)

In the embodiments illustrated in FIGS. 10 and 11, a shared token bucket was assumed. The same principles may be applied to systems that use separate token buckets, however. For example, when a dedicated token bucket for a certain class of packets is emptied, that event could trigger the imposition of a specified back-off interval for that class, type, priority, etc., of packets. In one embodiment, imposition of a back-off interval for a particular class of packets may trigger imposition of a back-off interval for lower classes of packets as well. In one embodiment, the back-off interval will not be imposed until the bucket for that particular class and all lower classes are empty as well, such as where a higher priority packet can steal tokens from lower priority buckets when its own bucket runs out of tokens.

Other actions that can be taken as part of a back-off mechanism include modifying the operation of a module within the node, a service hosted by the node, or a feature of the node. For example, a node that is suffering high congestion may choose to temporarily disable logging or tracing functions in order to free up CPU resources for other purposes or to generally increase message processing throughput.

A back-off condition may result in other consequences, as well. In embodiments that use a shared token bucket, for example, the congestion level active at the time of a refresh may cause the refresh mechanism to refill the token bucket to some value less than the maximum. Alternatively, the congestion level at the time of a refresh may trigger an adjustment of one or more threshold values used in the next measurement period. In embodiments that use separate token buckets, for example, the congestion level active at the time of a refresh may cause the refresh mechanism to change the maximum refill value for one or more token buckets (or refill one or more token buckets to some value less than their respective maximums.) Other variations and combinations thereof are within the scope of the subject matter described herein.

The examples described above show the operation of systems and methods for regulation of multi-priority traffic which define a single refresh period, but the subject matter described herein is not so limited. In one embodiment, the same principles may be simultaneously applied at different levels, different modules, different granularities, and different traffic weights. In one embodiment, the same principles may be simultaneously applied to the same end using different time scales, e.g., a system may define multiple refresh actions, each to be taken at a different refresh period. For example, one refresh action may be taken every second while another may be taken multiple times a second or after multiple seconds. Likewise, multiple back-off mechanisms may operate simultaneously.

In one embodiment, the same principles may be simultaneously applied to the same end using different hierarchically related system modules, components, services or features, e.g., a system may consist of one large module, in turn consisting of multiple smaller modules, each running its own instance of the algorithm, and define multiple refresh actions, each to be taken at the refresh period for the respective module. For example, one refresh action may be taken for the totality of traffic processed by a node, while another may be taken for ingress or egress traffic over individual connections to that node.

Figure 12:
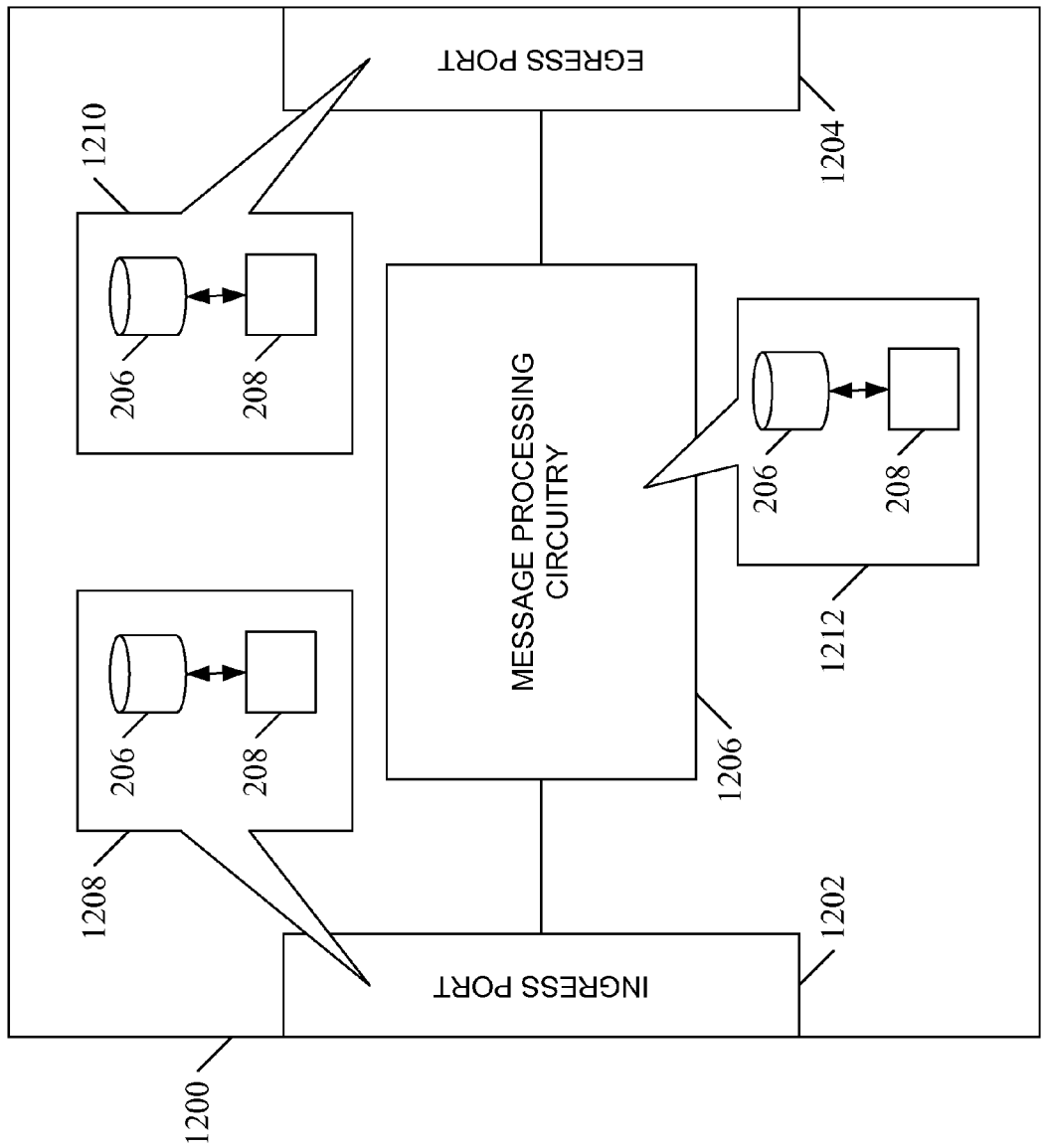
FIG. 12 is a block diagram of an exemplary system for regulation of multi-priority traffic in a telecommunications network according to yet another embodiment of the subject matter described herein.

FIG. 12 is a block diagram of an exemplary system for regulation of multi-priority traffic in a telecommunications network according to yet another embodiment of the subject matter described herein. In the embodiment illustrated in FIG. 12, a node 1200 includes an ingress port 1202, an egress port 1204, and message processing circuitry 1206 that can receive messages from ingress port 1202, process them, and send them to egress port 1204. Node 1200 includes several modules 1208, 1210, and 1212, each of which perform the methods described in FIG. 1, above. In the embodiment illustrated in FIG. 12, each module includes its own first module 206 for maintaining a set of threshold values and its own second module 208 for performing the steps of the algorithm. In the embodiment illustrated in FIG. 12, the methods described above may be performed simultaneously, e.g., to perform ingress control at ingress port 1202, to perform egress control at egress port 1204, while also performing internal traffic regulation at message processing circuitry 1206. Each instance 1208, 1210, and 1212 of the algorithm may use its own set of thresholds, measurement periods, etc., independently of the other instances. Likewise, other instances of the algorithm may exist on other nodes.

In one embodiment, the same principles may be simultaneously applied to the same end using different traffic weights, e.g., a system may define different weights for larger messages than for smaller messages. For example, a large message may consume 2 tokens, while a smaller one of the same priority may consume 1 token. Messages may be assigned higher or lower weights based on factors other than message size, as well, such as the type of message, the amount of processing overhead the message requires, the routing cost of the message, e.g., the number of nodes (switches, routers, etc.), geographical distance, etc., in the message path, and other factors. For example, messages that are simply relayed may be assigned a lower weight than messages that require additional processing by the node, such as application traffic. In one embodiment, there may be separate token buckets for messages of different weights. Buckets may be further subdivided, e.g., there may be separate buckets for each message priority and message weight combination. It should be noted that the term "weight" is merely a convenient notation to indicate some distinction between messages that cause some messages to consume one token while other messages consume more than one token, zero tokens, or even negative tokens. Messages may consume different numbers of tokens based on any message attribute, include those not conventionally referred to as a "weight".

The subject matter described herein provides several benefits over conventional approaches: it avoids under-utilization of network capacity; it is accurate and responsive; it allows action to be taken at discrete levels of capacity depletion; it allows the system to recover if capacity starts getting depleted; and it strictly limits the total amount of traffic in any given duration.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for regulation of multi-priority traffic in a telecommunications network, the method comprising:
receiving, at a node for processing and routing messages in a telecommunications network, the node comprising hardware, a message having an intended destination, and, in response to receiving the message:
determining, by the node, a priority of the message;
obtaining, by the node and from a plurality of threshold values, each threshold value being associated with one of a plurality of message priorities, a threshold value that is associated with the determined priority;

determining, by the node, a message count of messages that have been allowed during a current measurement period;

selecting, by the node, an action to perform based a relationship between the threshold value and the message count;

incrementing, by the node, the message count; and performing, by the node, the selected action; and detecting, by the node, a refresh condition, and, in response to detecting the refresh condition, starting a new measurement period.

2. The method of claim 1 wherein determining a message count comprises at least one of:

determining a count of all messages that have been allowed during the current measurement period; and determining a count of messages of the determined priority that have been allowed during the current measurement period.

3. The method of claim 1 wherein the selected action comprises one of:

discarding the message;

processing the message;

buffering the message;

forwarding the message to the intended destination;

redirecting the message to a destination other than the intended destination;

modifying an operation of a module within the node;

modifying an operation of a service hosted by the node; and modifying an operation of a feature of the node.

4. The method of claim 1 wherein maintaining a plurality of threshold values comprises maintaining a token bucket having a number of tokens corresponding to a maximum number of messages allowed per measurement period, wherein each message that is allowed consumes a specified number of tokens from the token bucket, and wherein each of the plurality of threshold values represents a minimum number of tokens that must be remaining in the token bucket in order to allow a message of a priority corresponding to the threshold value.

5. The method of claim 4 wherein starting a new measurement period comprises setting the number of tokens in the token bucket to the maximum number of messages allowed per measurement period.

6. The method of claim 4 wherein the specified number of tokens consumed by a message that is allowed is based on an attribute of the message.

7. The method of claim 1 wherein maintaining a plurality of threshold values comprises maintaining a plurality of token buckets, each bucket corresponding to a message priority, wherein each message of a particular priority that is allowed consumes a specified number of tokens from the bucket corresponding to that message priority, and wherein each of the plurality of threshold values represents a maximum number of tokens that can be contained by the bucket that corresponds to that priority.

8. The method of claim 7 wherein starting a new measurement period comprises setting the number of tokens in each bucket to the maximum number of tokens that can be contained by that bucket.

9. The method of claim 7 wherein the specified number of tokens consumed by a message that is allowed is based on an attribute of the message.

10. The method of claim 1 wherein detecting a refresh condition comprises at least one of:

determining that the current measurement period has expired;

determining that a threshold number of actions have been performed; and receiving a refresh command.

11. The method of claim 1 wherein performing the selected action operates to at least one of:

regulate ingress traffic into the node for processing messages;

regulate egress traffic out of the node for processing messages; and regulate routing traffic through the node for processing messages.

12. The method of claim 1 wherein the receiving, determining, obtaining, determining, selecting, incrementing, performing, and detecting at or by the node comprises performing the receiving, determining, obtaining, determining, selecting, incrementing, performing and detecting at or by a node configured for processing and routing Diameter messages.

13. The method of claim 1 comprising detecting that the message count of messages that have been allowed during a current measurement period has crossed a threshold that is associated with a priority, and, in response to determining that the threshold has been crossed, imposing a back-off condition on messages of that priority.

14. The method of claim 13 wherein the back-off condition is imposed for a specified duration of time.

15. The method of claim 13 wherein the back-off condition imposed comprises at least one of:

discarding or redirecting messages of that priority;

adjusting a threshold value associated with messages of that priority; and adjusting a number of tokens that are put into a token bucket during refresh.

16. The method of claim 1 comprising controlling, by the node, a maximum actual rate by adjusting a length of the measurement period.

17. A node comprising hardware for processing and routing messages in a telecommunications network, the node further comprising:

a memory for storing a first module and a second module;

a processor which, upon execution of the first module, maintains a plurality of threshold values, each threshold value being associated with one of a plurality of message priorities; and upon execution of the second module, the processor receiving a message having an intended destination, and, in response to receiving the message, determining a priority of the received message, obtaining from the first module a threshold value that is associated with the determined priority, determining a message count of messages that have been allowed during a current measurement period, selecting an action to perform based a relationship between the threshold value and the message count, incrementing the message count, and performing the selected action;

wherein the node is further configured for detecting a refresh condition, and, in response to detecting the refresh condition, starting a new measurement period.

18. The node of claim 17 comprising a Diameter signaling router (DSR) or a Diameter routing agent (DRA).

19. The node of claim 17:

wherein said memory stores a third module and a fourth module;

said processor, upon execution of said third module, maintaining a second plurality of threshold values, each threshold value being associated with one of a plurality of message priorities; and said processor, upon execution of said fourth module, in response to the message being received by the second module, determining a priority of the received message, obtaining from the third module a second threshold value that is associated with the determined priority, determining a message count of messages that have been allowed during a current second measurement period, selecting a second action to perform based a relationship between the second threshold value and the message count, incrementing the message count, and performing the second selected action, wherein the node is further configured for detecting a second refresh condition, and, in response to detecting the second refresh condition, starting a new second measurement period.

20. A non-transitory computer readable medium having stored thereon executable instructions that when executed by the processor of a computer control the computer to perform steps comprising:

maintaining a plurality of threshold values, each threshold value being associated with one of a plurality of message priorities;
    receiving a message having an intended destination, and, in response to receiving the message:
        determining a priority of the received message;
        obtaining a threshold value that is associated with the determined priority;
        determining a message count of messages that have been allowed during a current measurement period;
        selecting an action to perform on the received message based a relationship between the threshold value and the message count;
        incrementing the message count; and
        performing the selected action; and
    detecting a refresh condition, and, in response to detecting the refresh condition, starting a new measurement period.

\* \* \* \* \*